P. W. MORRISSEY.
BALING PRESS.
APPLICATION FILED JUNE 27, 1914.
1,130,006.
Patented Mar. 2, 1915.
3 SHEETS—SHEET 1.
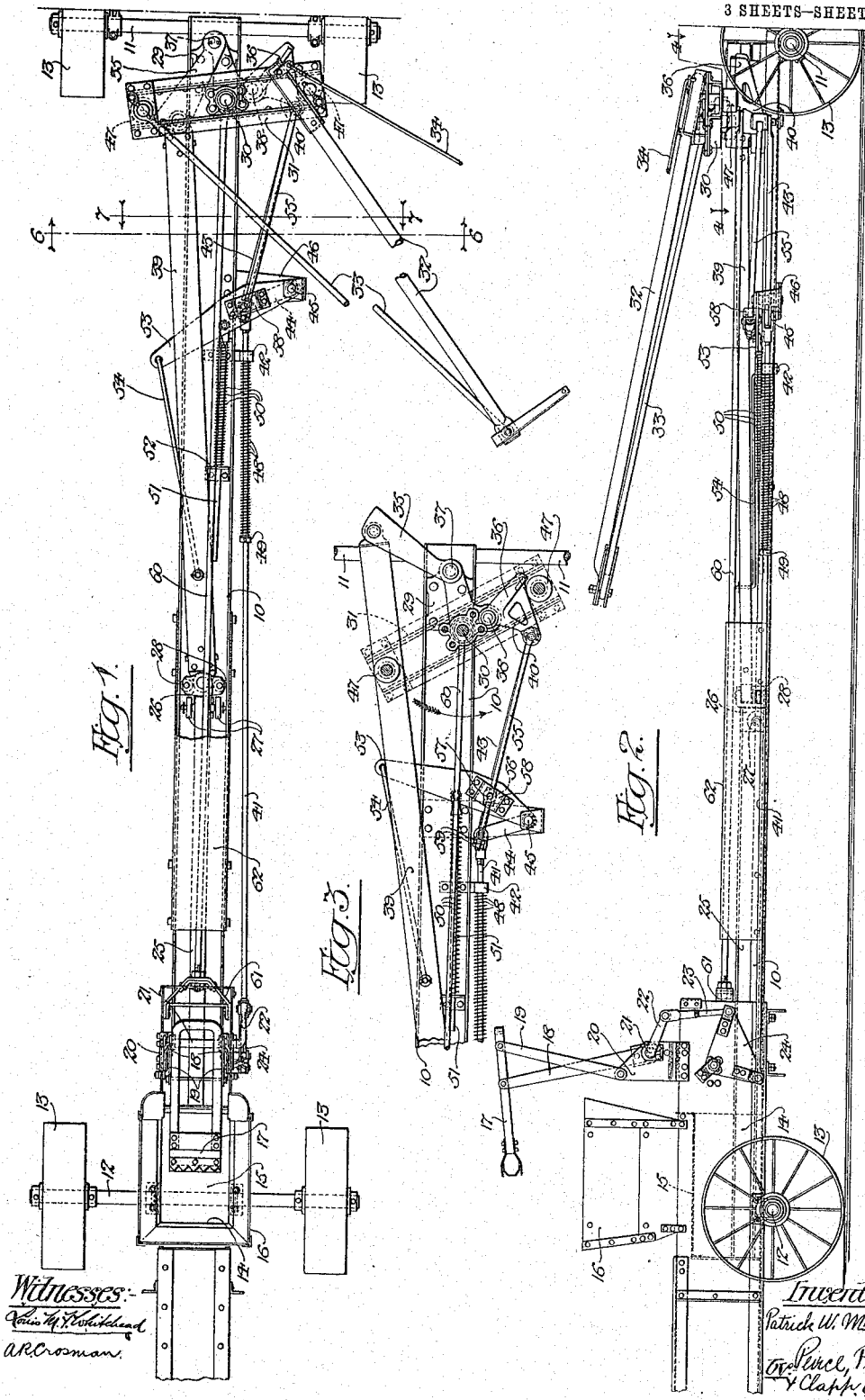

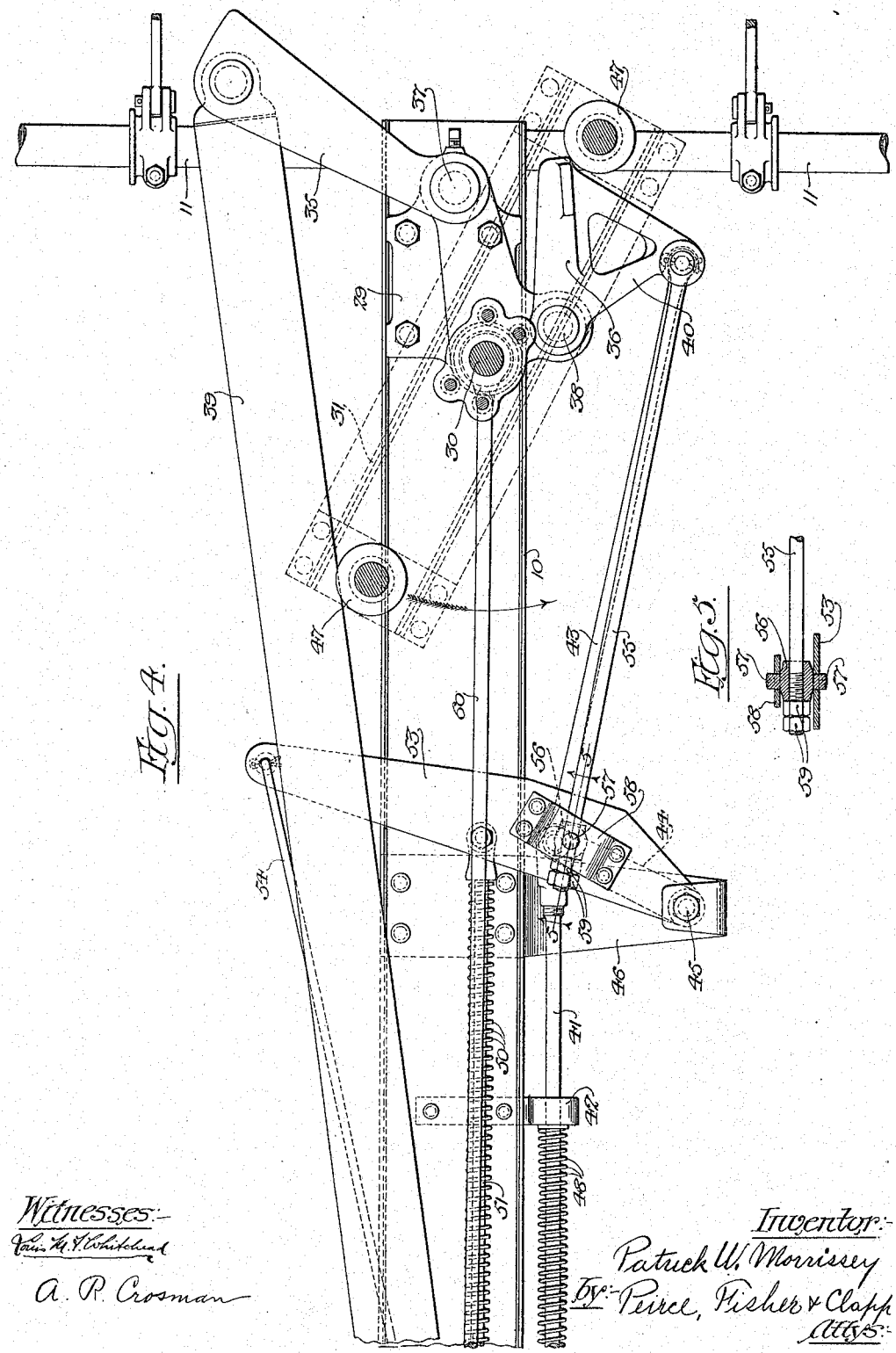

P. W. MORRISSEY.
BALING PRESS.
APPLICATION FILED JUNE 27, 1914.
1,130,006.
Patented Mar. 2, 1915.
3 SHEETS—SHEET 3.
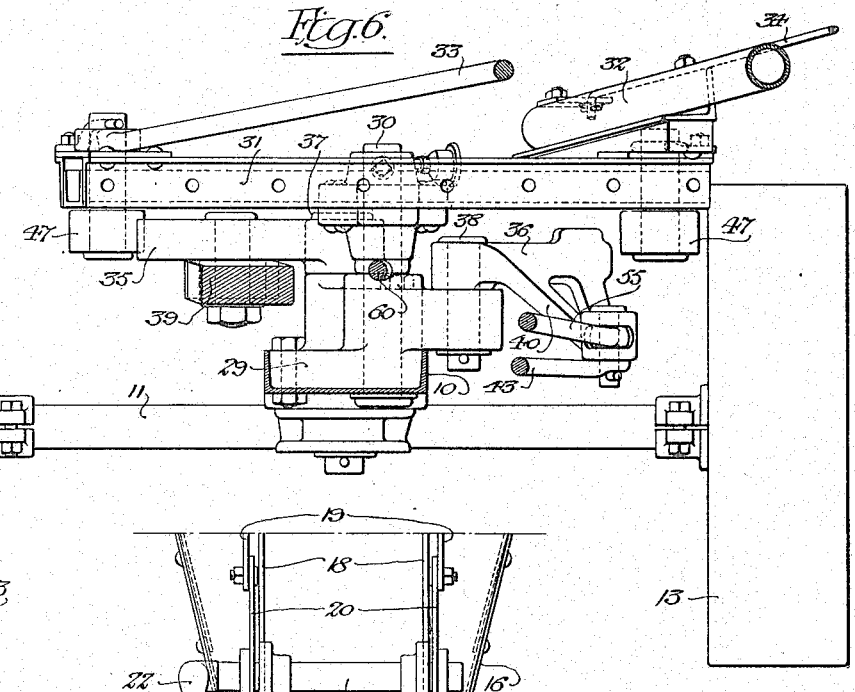

[U]NITED STATES PATENT OFFICE.

PATRICK W. MORRISSEY, OF RACINE, WISCONSIN, ASSIGNOR TO J. I. CASE THRESHING MACHINE COMPANY, OF RACINE, WISCONSIN, A CORPORATION.

BALING-PRESS.

1,130,006.

Specification of Letters Patent.

Patented Mar. 2, 1915.

Application filed June 27, 1914. Serial No. 847,583.

*To all whom it may concern:*

Be it known that I, PATRICK W. MORRISSEY, a citizen of the United States, and a resident of Racine, county of Racine, and State of Wisconsin, have invented certain new and useful Improvements in Baling-Presses, of which the following is a full, clear, and exact description.

The invention relates to presses for baling hay and the like, and more particularly to baling presses designed to be operated by horse power.

The invention seeks to provide simple and effective means for operating the compressing plunger and the feeder of the baler, and to provide an intermediate safety device which will prevent the plunger and feeder from interfering with each other.

The invention consists in the features of improvement hereinafter set forth and illustrated in the preferred form in the accompanying drawings, and more particularly pointed out in the appended claims.

Figure 1 is a plan view of the improved baling press. Fig. 2 is an elevation thereof. Fig. 3 is a partial plan view of the operating mechanism with parts shown in shifted position. Fig. 4 is an enlarged detailed plan view with parts shown in section from a line 4—4 of Fig. 2. Fig. 5 is a detailed section on the line 5—5 of Fig. 4. Figs. 6 and 7 are enlarged detailed cross sections on the lines 6—6 and 7—7 of Fig. 1, The frame of the machine comprises a longitudinally extending channel bar 10, which is suitably mounted at its ends upon front and rear axles 11 and 12, which are provided with supporting wheels 13. At its rear end the frame is provided with a suitable baling chamber 14, within which reciprocates the compressing member or plunger 15. The baling chamber is provided with a suitable hopper 16, and a feeding member 17 is arranged to force the material from the hopper and into the compressing chamber when the plunger is withdrawn therefrom.

In the construction shown the feeder 17 is mounted upon the upper ends of a pair of operating arms 18 and upon the upper ends of a pair of guiding arms 19, the latter being pivoted upon upwardly projecting brackets 20 on the forward end of the baling chamber. The operating arms 18 are fixed to a cross shaft 21 which is journaled in the brackets 20 and which is provided with an operating crank arm 22. A link 23 connects the crank arm 22 to a bell-crank lever 24 pivoted on the side wall of the baling chamber. The plunger 15 is mounted upon the rear end of a plunger rod 25. At its forward end the plunger rod is connected to a cross-head 26, which slides within the channel bar 10, and which is preferably provided with pairs of rollers 27 and 28 for engaging the web and flanges of the channel bar.

A casting 29 is fixed to the front end of the channel bar 10 and is provided with a short vertical stud or pivot 30 whereon a rotary power arm 31 is centrally journaled. A sweep 32 is connected to one end of the power arm and a brace rod 33 extends between the outer end of the sweep and the opposite end of the power arm. When the machine is in operation, the horses as usual are attached to the outer end of the sweep. If desired, a guide link 34 may be attached to the inner end of the sweep and the forward end of the team.

A pair of shift levers 35 and 36 are connected by vertical pivots or studs 37 and 38 to the casting 29. The shift lever 35 is connected by a pitman rod 39 to the crosshead 26, for operating the compressing plunger. The other shifting arm is preferably in the form of a bell-crank, and is provided with a downwardly inclined arm 40, which is connected to the bell-crank 24 to actuate the feeder 17. The connecting rod between the arm 40 and bell-crank 24 is preferably jointed and comprises a section 41 connected at its rear end to the bellcrank 24, and having its forward end extending through a guide-loop 42 that projects laterally from the channel bar 10. The other section 43 of the jointed connecting rod is pivotally connected to the forward end of the section 41 and to the arm 40. A swinging guide link 44 (see Figs. 4 and 7) engages a pivotal connection between sections 41 and 43 of the jointed connecting rod. The outer end of the guide link 44 is connected by a vertical pivot pin 45 to the U-shaped end of a bracket 46 that projects laterally from the channel bar 10.

The rotary power arm 31 is provided at its ends and on its under side with abutments or rollers 47 which are arranged to successively engage suitable working faces on the shift levers 35 and 36, and thereby effect the working strokes of the compressing plunger and feeder. The return movement of the feeder 17 is effected by a spring 48 coiled about the connecting rod 41 and interposed between a sleeve 49 thereon and the guide bracket 42. The restoring movement of the compressing plunger is effected in part by the compressed material, but it is also preferably provided with a restoring spring 50. This spring is coiled about a rod 51, which slides through a guide bracket 52 on the bottom of the channel bar. The forward end of the guide rod, in the form shown, is connected to a shift lever 53, which in turn is connected by a link 54 to the pitman 39. The lever 53 is mounted upon the pivot pin 45 above the guide link 44. The rod 51 is connected to the shift lever 53 intermediate its ends, and the rod 54 is connected to the free end of the shift lever. The shift lever 53 is also connected to the feeding member 17 and preferably through the medium of a link 55, the forward end of which is pivoted to the arm 40. The rear end of the link 55 slides through a block 56, which is provided with vertical pivots 57 that engage the lever 53, and a bent plate or bracket 58 secured thereto. Nuts 59 threaded on the rear end of the link 55 are arranged to engage the block 56 and thereby form a one-way or lost-motion connection between the link 55 and the lever 53. A longitudinally extending brace rod 60 is connected at its forward end to the casting 29, and, at its rear end, is connected by a yoke 61 to the baling chamber. A shield 62 is preferably fixed to the channel bar 10 and extends over the plunger rod 25, the crosshead 26 and the rear portion of the brace rod 60.

In operation, the wheels are removed so that the machine frame rests upon the ground and horses are attached to the sweep 32 to rotate the power arm 31. As the latter rotates, one of the rollers engages the shift lever 35 to thereby effect the working stroke of the compressing plunger 15 through the medium of the pitman 39 and plunger rod 25. During this movement the shift lever 35 is moved from the position shown in Fig. 4 to that indicated in Fig. 1. At the end of the working stroke of the plunger, the abutment or roller 47 passes over the outer end of the shift lever 35 and the spring 50 then acts through the medium of the lever 53 and link 54 to effect the restoring movement of the plunger. The parts are then in the position shown in Fig. 3. This restoring movement of the plunger and parts connected thereto does not affect the shift lever 36 because of the lost-motion connection between the lever 53 and link 55.

The roller or abutment 47 at the other end of the power arm then engages the lever 36 and shifts it from the position shown in Figs. 1 and 3 to that shown in Fig. 4, to thereby effect the working stroke of the feeder through the medium of the jointed connecting rods 41 and 43. During this movement the lost motion between the link 55 and the intermediate lever 53 is taken up, and, in case the spring 50 has failed to completely restore the plunger, the restoring movement of the latter will be completed by the shift lever 36 through the medium of link 55, lever 53 and link 54. As soon as the roller or abutment passes over the outer end of the arm 36, the restoring spring 48 acts quickly to effect a return stroke of the feeder 17 and of the operating shift lever 36. This restoring movement, however, does not move the intermediate lever 53, because of the lost motion between the latter and the connecting link 55. When the shift lever 35 is again actuated to effect the working stroke of the plunger, the lost motion between the lever 53 and link 55 is taken up and if the spring 48 has failed to restore the feeder 17 or move it out of the way of the plunger, this restoring movement will be effected by the lever 53 acting on the shift lever 36 through the medium of the link 55.

In the improved construction the restoring springs act to quickly effect the return movements of the compressing plunger and of the feeding member, but if either of these parts are caught so that the springs do not properly operate, the intermediate lever 53 is brought into action to effect the restoring movement of these parts. In this way the benefit of quick acting restoring springs is retained and at the same time the intermediate member or lever 53 acts as a safety device and prevents any interference between the plunger and feeder.

The improved construction is simple and compact and can be operated rapidly and efficiently. It is obvious that numerous changes may be made in the details set forth without departure from the essentials of the invention as defined in the claims.

I claim as my invention:—

1. In a baling press, the combination of compressing and feeding members, shifters therefor, a rotary power arm arranged to successively actuate said shifters to effect the working strokes of said members, restoring springs for said members, and an intermediate safety device connected to both of said members, substantially as described.

2. In a baling press, the combination of compressing and feeding members, shifters therefor, a rotary power arm arranged to successively actuate said shifters to effect the working strokes of said members, restoring springs for said members, and a safety shifter interposed between said members and having a lost-motion connection with one member, substantially as described.

3. In a baling press the combination of compressing and feeding members, shifters therefor, a rotary power arm arranged to successively actuate said shifters to effect the working strokes of said members, a restoring spring for said feeding member, and an intermediate safety device connected to said compressing member and having a lost-motion connection with said feeding member, substantially as described.

4. In a baling press, the combination of compressing and feeding members, shifters therefor, a rotary power arm arranged to successively actuate said shifters to effect the working strokes of said members, restoring springs for said members, and an intermediate safety device connected to said compressing member and having a lost-motion connection with said feeding member, substantially as described.

5. In a baling press, the combination of a plunger, a feeder, operating shift levers connected respectively to said plunger and said feeder, a power arm for successively actuating said shift levers to effect the working strokes of said plunger and said feeder, and an intermediate lever connected to both of said parts, substantially as described.

6. In a baling press, the combination of a plunger, a feeder, operating shift levers connected respectively to said plunger and said feeder, a spring-pressed restoring lever connected to said plunger and having a lost-motion connection with said feeder, and a restoring spring for said feeder, substantially as described.

7. In a baling press, the combination of a plunger, a feeder, operating shift levers, a pitman and a connecting rod respectively connecting said shift levers to said plunger and said feeder, a rotary power arm for successively actuating said shift levers, an intermediate lever, and links connecting the latter to said pitman and to said feeder shift lever, substantially as described.

8. In a baling press, the combination of a plunger, a feeder, operating shift levers, a pitman and a connecting rod respectively connecting said shift levers to said plunger and said feeder, a rotary power arm for successively actuating said shift levers, a restoring spring engaging said connecting rod, an intermediate lever connected to said pitman, and a link connecting said intermediate lever and said feeder shift lever and having a lost-motion connection with one of said parts, substantially as described.

9. In a baling press the combination of a plunger, a feeder, operating shift levers, a pitman and a connecting rod respectively connecting said shift levers to said plunger and said feeder, a rotary power arm for successively actuating said shift levers, a spring-pressed restoring lever connected to said pitman, a restoring spring engaging said connecting rod, and a link connected to said feeder shift lever and having a lost-motion connection with said restoring lever, substantially as described.

10. In a baling press, the combination with the frame and baling chamber, of a plunger and a feeder coöperating with said baling chamber, a plunger rod, a sliding cross-head therefor, a pair of shift levers, a pitman connecting one of said shift levers to said cross-head, a rod comprising joined sections connecting the other shift lever to said feeder, a swinging guide link for said jointed connecting rod, and a rotary power arm for successively actuating said shift levers, substantially as described.

PATRICK W. MORRISSEY.

Witnesses:
 Theo. Johnson,
 Wallace F. MacGregor.

Copies of this patent may be obtained for five cents each, by addressing the "Commissioner of Patents, Washington, D. C."